(12) United States Patent
Reed

(10) Patent No.: US 6,549,351 B1
(45) Date of Patent: Apr. 15, 2003

(54) AUXILIARY DATA ENCODING IN A DISK DRIVE SYSTEM

(75) Inventor: David E. Reed, Westminster, CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/338,019

(22) Filed: Jun. 22, 1999

(51) Int. Cl.[7] .............................................. G11B 5/09
(52) U.S. Cl. ...................................... 360/40; 360/77.04
(58) Field of Search ............................ 360/32, 39, 40, 360/41, 77.04

(56) References Cited

U.S. PATENT DOCUMENTS

| | | | |
|---|---|---|---|
| 4,475,212 A | * 10/1984 | McLean et al. | ............... 375/17 |
| 4,837,641 A | * 6/1989 | Mori et al. | .................... 360/32 |
| 5,638,226 A | * 6/1997 | Koren | ......................... 360/40 |
| 5,684,650 A | * 11/1997 | Kadlec et al. | ........... 360/77.06 |
| 5,726,818 A | 3/1998 | Reed et al. | |
| 5,737,142 A | 4/1998 | Zook | |
| 5,786,950 A | 7/1998 | Zook et al. | |
| 5,796,535 A | 8/1998 | Tuttle et al. | |
| 5,850,377 A | 12/1998 | Taguchi et al. | |
| 5,872,754 A | 2/1999 | Taguchi et al. | |
| 5,926,490 A | 7/1999 | Reed et al. | |
| 6,097,565 A | * 8/2000 | Sri-Jayantha et al. | .... 360/78.09 |

OTHER PUBLICATIONS

Stikvoort, Eduard F., "An All–Digital Bit Detector for Compact Disc Players," IEEE Journal on Selected Areas in Communications, vol. 10 (No. 1), p. one, (Nov. 17, 1992).

Siegel, Paul H., "Modulation and Coding for information Storage," IEEE Communications Magazine, IEEE, p. 68–86, (Nov. 17, 1991).

* cited by examiner

*Primary Examiner*—David Hudspeth
*Assistant Examiner*—Mitchell Slavitt

(57) ABSTRACT

A disk drive system comprises control circuitry and a disk device. The disk device transfers a read signal representing user data, servo data, and auxiliary data to the control circuitry. The control circuitry detects encoded signals representing "0" and "1" auxiliary data bits from the read signal. The control circuitry decodes the encoded signals into the auxiliary data bits. The encoded signals representing the "0" auxiliary data bits have opposite polarity from the encoded signals representing the "1" auxiliary data bits. Polarity reversal pulses are between consecutive encoded signals with opposite polarities. The auxiliary data bits could be repeatable run-out data that is processed to generate a position signal that the disk device uses to compensate for repeatable run-out error.

32 Claims, 5 Drawing Sheets

AUXILIARY DATA ENCODING IN A DISK DRIVE SYSTEM

BACKGROUND OF THE INVENTION

1. Field of the Invention

The invention is related to the field of disk drive systems, and in particular, to disk drive systems and circuitry that encode auxiliary data using polarity reversal pulses.

2. Statement of the Problem

Disk drive systems include control circuitry and a disk device. The disk device stores user data, servo data, and auxiliary data. A computer system exchanges the user data with the control circuitry. The control circuitry exchanges the user data with the disk device for storage. To facilitate these data exchanges, the disk device reads and transfers servo data to the control circuitry. The servo data includes position information, such as a timing mark, head number, and cylinder number. The control circuitry uses the servo data to locate data on the disk device. The disk device also reads and transfers auxiliary data to the control circuitry. The auxiliary data typically follows the servo data on the disk. The control circuitry uses the auxiliary data to control the disk device. For example, the auxiliary data may include information that is used to compensate for defects in the disk device.

To write the auxiliary data to the disk device, the control circuitry first converts the auxiliary data into encoded signals. The control circuitry then controls the disk device to create magnetic transitions on the disk device that correspond to the encoded signals. To read the auxiliary data, the control circuitry controls the disk device to detect the magnetic transitions. The control circuitry then detects the encoded signals from the magnetic transitions and decodes the encoded signals into the auxiliary data.

Repeatable Run-Out (RRO) occurs when the data track on the disk surface does not appear to form a circle as the disk surface spins. If the RRO is substantial, portions of the data may not even appear proximately under the head causing a failure of the disk drive system. In some disk drive systems, the auxiliary data is RRO data. The RRO data is typically an integer that indicates the amount of RRO error for that area of the disk surface. The disk drive system uses the RRO data alter the position of the head keeping it over the non-circular data track.

As the disk surface spins, the head detects the magnetic transitions on the disk surface and transfers an analog read signal representing these transitions from the disk device to the read channel in the control circuitry. The read channel samples and filters the analog read signal. The read channel then processes the filtered samples to detect encoded signals. The read channel decodes the encoded signals into data bits and transfers a resulting bit sequence containing the servo data and the RRO data to servo control. The servo control processes the servo and RRO data to provide a position control signal to the position system, and in response to the position control signal, the position system positions the head over the appropriate point above the spinning disk surface. In particular, the servo control processes the RRO data to adjust the position of the head to compensate for RRO error.

The RRO data may use PR4-like encoding where a "1" is encoded as "1 1 −1 −1", and a "0" is encoded as "0 0 0 0". This encoding associates "1 1" with a rising edge magnetic transition, "−1 −1" with a falling edge magnetic transition, and "0 0" with no magnetic transition.

Unfortunately, disk drive systems cannot effectively exchange user data with the computer system when RRO error causes a loss of data. It should be appreciated that detecting RRO data is critical to the operation of the disk device, and to the effectiveness of the computer system. Thus, improved encoding techniques that provide better bit error rates when detecting RRO data would improve the operation of disk drive systems and computers.

Given the enormous growth in the demand for computer data storage, there is an acute need to continually improve the performance of disk drive systems. In particular, solutions are needed to reduce problems with RRO data detection. These solutions will provide for faster and more accurate data exchanges between the disk drive system and the computer system.

SUMMARY OF THE SOLUTION

The invention solves the above problem by providing improved disk drives and control circuitry that decode auxiliary data having polarity reversal pulses. The invention provides improved bit error rates with twice the decision distance of Gray coding because of the polarity reversal. The invention improves the operation of disk drives and computers by providing faster and more accurate data exchanges.

The invention includes disk drive circuitry, systems, and methods. The disk drive system comprises control circuitry and a disk device. The disk device transfers a read signal representing user data, servo data, and auxiliary data to the control circuitry. The control circuitry detects encoded signals representing "0" and "1" auxiliary data bits from the read signal. The control circuitry then decodes the encoded signals into the auxiliary data bits. The encoded signals representing the "0" auxiliary data bits have opposite polarity from the encoded signals representing the "1" auxiliary data bits. Polarity reversal pulses are placed between consecutive encoded signals with opposite polarities. The auxiliary data bits could be repeatable run-out data that is processed to generate a position signal that the disk device uses to compensate for repeatable runout error.

DETAILED DESCRIPTION OF THE INVENTION

Figure 1:
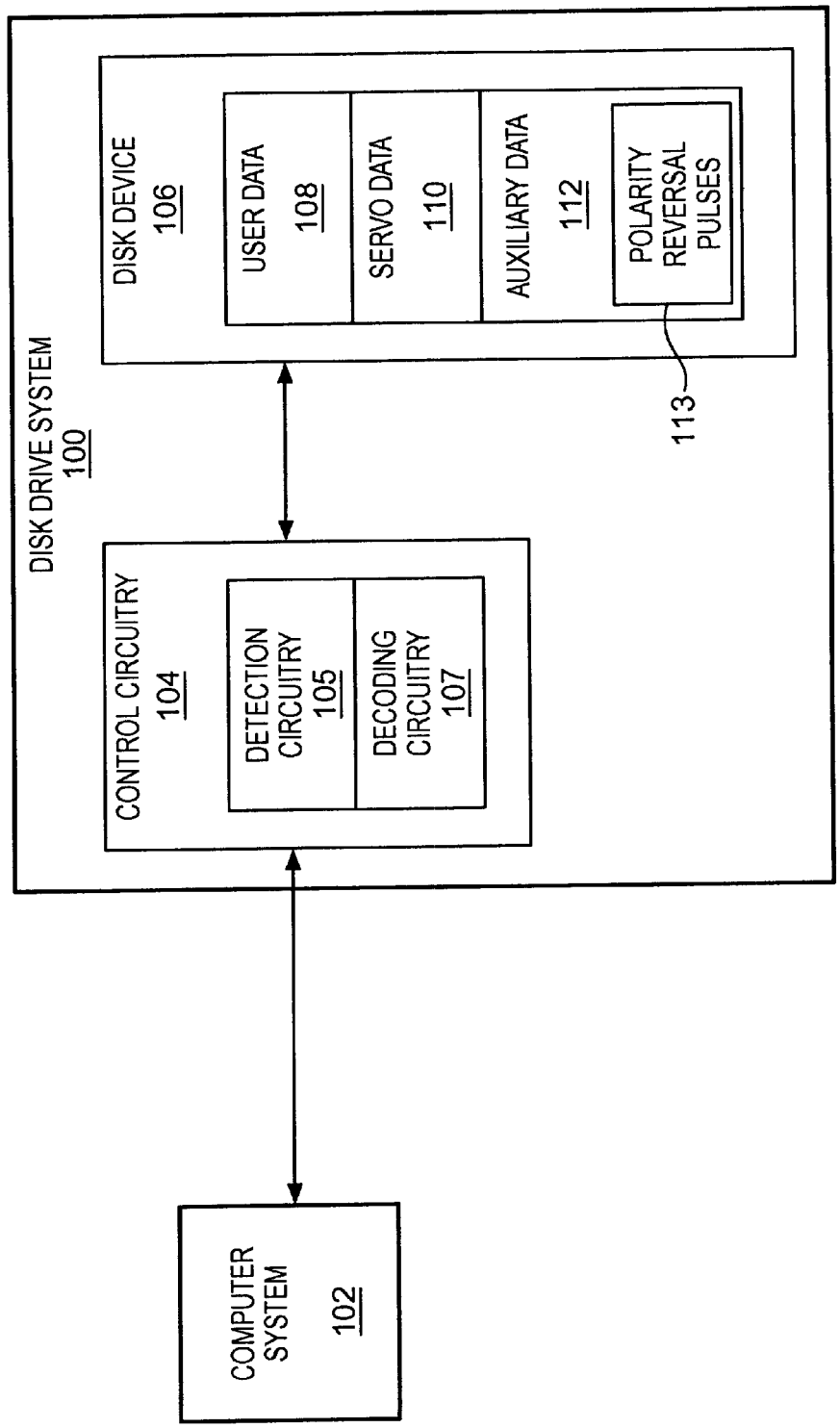
FIG. 1 is a block diagram that depicts a disk drive system in an example of the invention.

Disk Drive System—FIG. 1

FIG. 1 shows a disk drive system 100 connected to a computer system 102. The disk drive system 100 includes control circuitry 104 and disk device 106. The control circuitry 104 includes detection circuitry 105 and decoding circuitry 107. The disk device 106 stores user data 108, servo data 110, and auxiliary data 112. In a distinct advance in the art, the disk drive system 100 decodes the auxiliary data 112 having polarity reversal pulses 113 in between encoded auxiliary data signals of opposite polarities.

In operation, the computer system 102 exchanges the user data 108 with the control circuitry 104. The control circuitry 104 exchanges the user data 108 with the disk device 106 for storage. To facilitate these data exchanges, the disk device 106 reads and transfers servo data 110 to the control circuitry 104. The servo data 110 includes position information, such as a timing mark, head number, and cylinder number The control circuitry 104 uses the servo data 110 to locate data on the disk device 106.

The disk device 106 also reads and transfers the auxiliary data 112 to the control circuitry 104. The auxiliary data 112 typically follows the servo data 110 on the disk device and could include any data that is not user data 108 or servo data 110. The control circuitry 104 typically uses the auxiliary data 112 to control the disk device 106. For example, the auxiliary data 112 may include information that is used to compensate for defects in the disk device 106.

To write the auxiliary data 112 to the disk device 106, the control circuitry 104 first converts the auxiliary data 112 into encoded signals. The control circuitry 104 then controls the disk device 106 to create magnetic transitions on the disk device 106 that correspond to the encoded signals. To read the auxiliary data 112, the control circuitry 104 controls the disk device 106 to detect the magnetic transitions. The control circuitry 104 uses the detection circuitry 105 to detect the encoded signals from the magnetic transitions. The control circuitry 104 then uses the decoding circuitry 107 to decode the encoded signals into the auxiliary data 112.

The decoding circuitry 107 is configured to operate using the following decoding system. The encoded signals have opposite polarities to distinguish between "0" and "1" auxiliary data bits. For example, a "0" could be encoded as "−1 −1 1 1", and a "1" could be encoded in the opposite polarity as "1 1 −1 −1". The polarity reversal pulses 113 are inserted between each encoded signal of the auxiliary data 112. The polarity reversal pulses 113 are "0", which is effectively no pulse, between the encoded signals having the same polarity. The polarity reversal pulses 113 are "1" or "−1" between encoded signals having different polarities.

Figure 2:
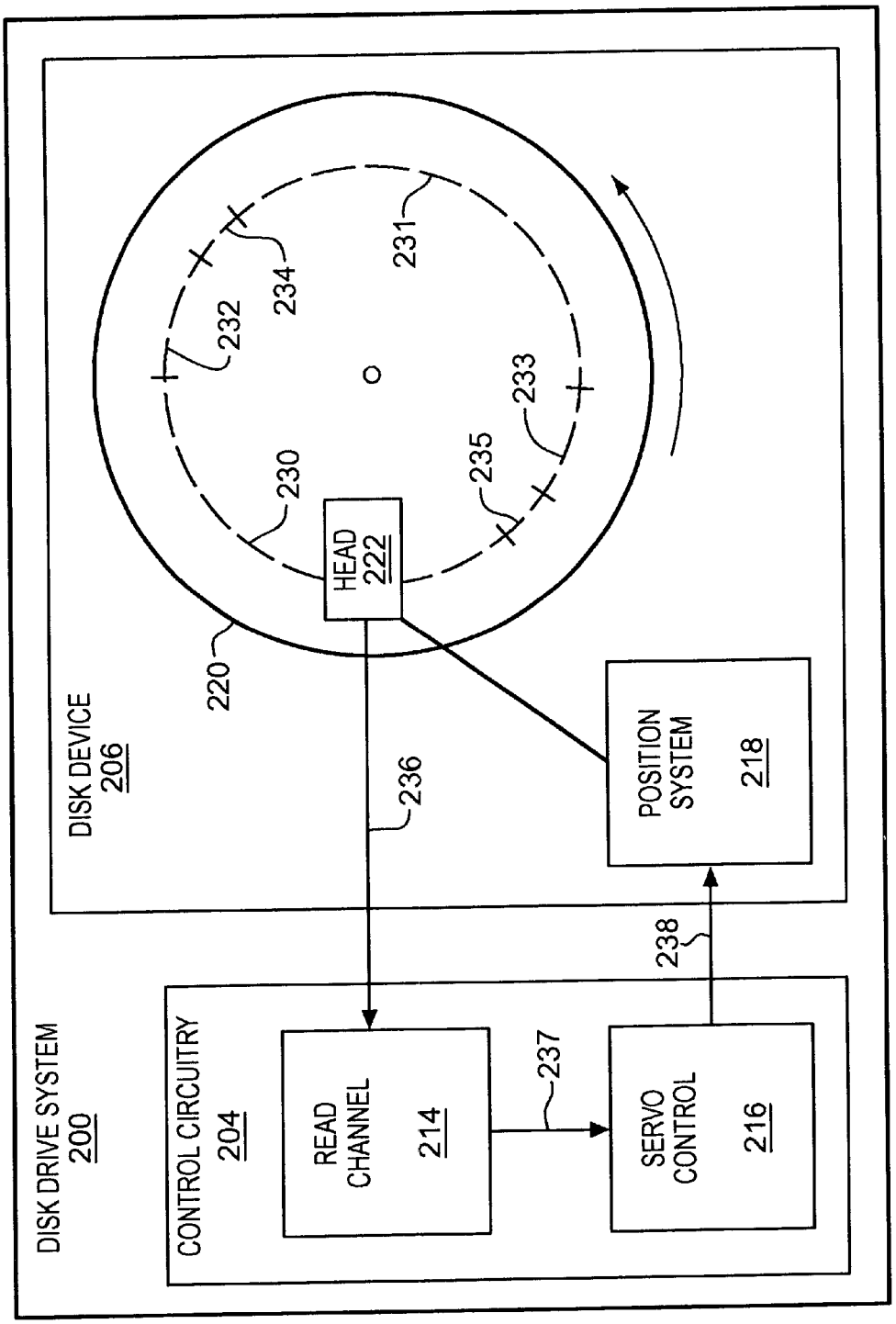
FIG. 2 is a block diagram that depicts a disk device and control circuitry in an example of the invention.
Figure 3:
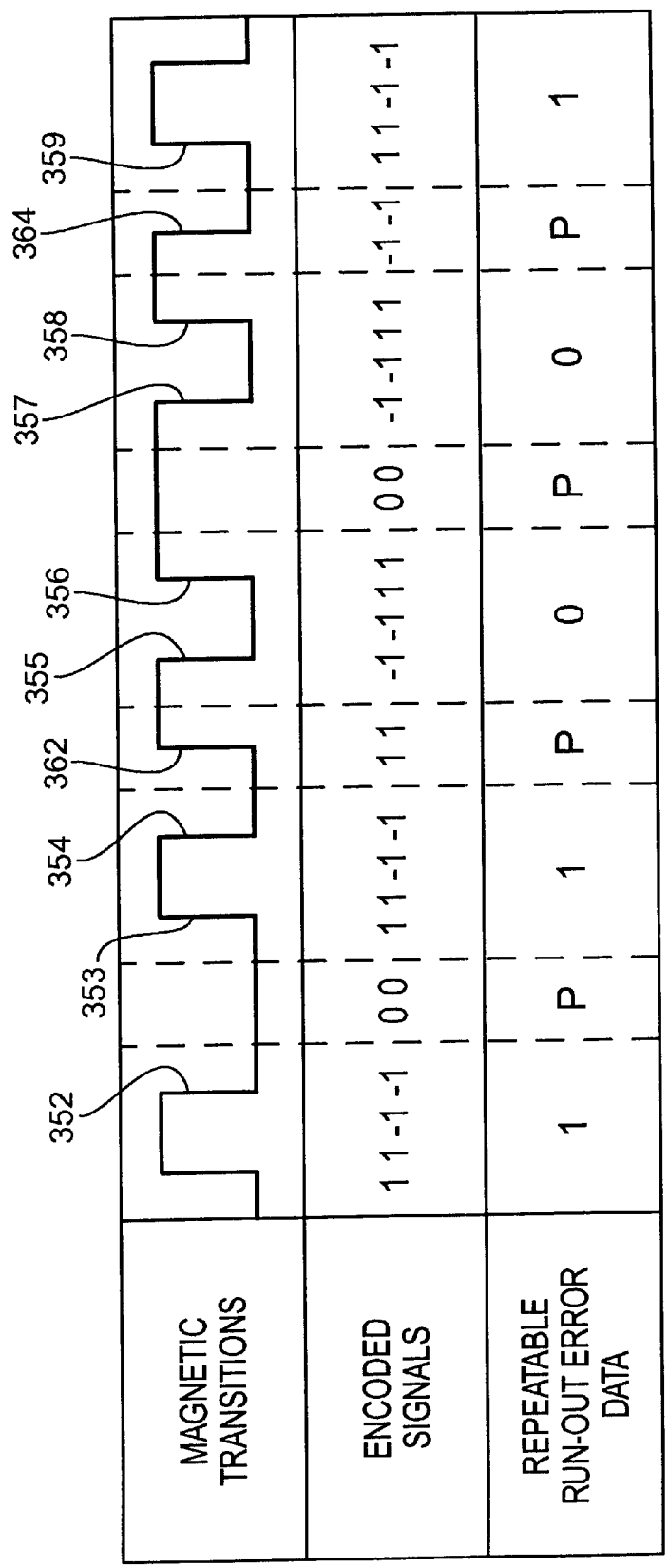
FIG. 3 is a chart that illustrates an encoding scheme in an example of the invention.

Disk Device and Control Circuitry—FIGS. 2–3

FIGS. 2–3 show a specific example of a magnetic disk drive system in accord with the present invention where the auxiliary data is RRO data. Those skilled in the art will appreciate numerous variations from this example that do not depart from the scope of the invention. Those skilled in the art will also appreciate that various features described below could be combined with the above-described embodiment to form multiple variations of the invention.

FIG. 2 shows a magnetic disk drive system 200 including control circuitry 204 and disk device 206 with an overhead view of the disk device 206. The control circuitry 204 includes a read channel 214 and servo control 216. The disk device 206 includes a position system 218, a disk surface 220, and a head 222. The disk surface 220 has a circular data track depicted by a dashed line that includes user data 230 and 231, servo data 232 and 233, and RRO data 234 and 235. There are typically many more disk surfaces, heads, data tracks, and control circuits in a disk drive, but the number depicted is restricted for clarity.

RRO error occurs when the data track does not appear to form a circle as the disk surface 220 spins. For example, if the data track is oval-shaped, then the data 230–235 will not pass under the same part of the head 222 as the disk surface 220 spins. If the RRO error is substantial, portions of the data 230–235 may not even appear proximately under the head 222 causing a failure of the disk drive system 200. The RRO data 234–235 indicates the amount of RRO error for the surrounding area of the disk surface 220. The disk drive system 200 uses the RRO data 234–235 to alter the position of the head 222 and keep it positioned over the non-circular data track.

As the disk surface 220 spins, the head 222 detects the magnetic transitions on the disk surface 220 and transfers an analog read signal 236 representing these transitions to the read channel 214. The read channel 214 samples and filters the analog read signal 220. The read channel 214 then processes the filtered samples to detect encoded signals. The read channel 222 decodes the encoded signals into data bits and transfers a resulting bit sequence 237 containing the servo and RRO data 232–235 to the servo control 216.

The servo control 216 processes the servo and RRO data 232–235 to provide a position control signal 238 to the position system 218, and in response to the position control signal 238, the position system 218 positions the head 222 over the appropriate point above the spinning disk surface 220. In particular, the servo control 216 processes the RRO data 234–235 to adjust the position of the head 222 to compensate for RRO error.

FIG. 3 illustrates an encoding system that the disk drive system 100 uses to encode and decode the RRO data 234–235. The encoding system uses PR4-like signals with opposite polarities and polarity reversal pulses. The magnetic transitions on the disk device are shown across the top. The encoded signals, polarity reversal pulses, and RRO data are shown under the corresponding magnetic transitions. The RRO data could be any sequence of bits with polarity reversal pulse (P) inserted between each bit. The sequence 1 P1P0P0P1 is shown for illustrative purposes. A set of RRO data typically comprises a set of random bits.

The encoded data associates "1 1" with a rising edge magnetic transition, "−1 −1" with a falling edge magnetic transition, and "0 0" with no magnetic transition. An RRO data bit of "1" is encoded into the signal "1 1 −1 −1". An RRO data bit of "0" is encoded into the signal "−1 −1 1 1". Thus, the encoded signals for "0" and "1" have opposite polarities. The encoded signal "1 1 −1 −1" is transferred to the disk surface as the magnetic transition of a positive square wave where the "1 1" is rising edge and the "−1 1" is the falling edge. The encoded signal "−1 −1 1 1" is transferred to the disk surface as the magnetic transition of an inverse square wave where the "−1 −1" is the falling edge and the "1 1" is rising edge.

Polarity reversal pulses are placed in between each RRO data bit. The encoded signals for the polarity reversal pulses are either "1 1", "0 0", or "−1 −1" depending of the adjacent RRO data bits. The polarity reversal pulses "0 0" are effectively no pulse. If consecutive RRO data bits are "1 1", then polarity reversal pulses of "0 0" are used because the falling edge 352 leads naturally to the subsequent rising edge 353. If consecutive RRO data bits are "1 0", then polarity reversal pulses of "1 1" are used because the falling edge 354 requires a rising edge 362 to meet the subsequent falling edge 355. If consecutive RRO data bits are "0 0", then polarity reversal pulses of "0 0" are used because the rising edge 356 leads naturally to the subsequent falling edge 357. If consecutive RRO data bits are "0 1", then polarity reversal pulses of "−1 −1" are used because the rising edge 358 requires a falling edge 364 to meet the subsequent rising edge 364. Thus, a polarity reversal pulse causes a magnetic transition in between encoded signals of opposite polarities, which is also in between RRO data bits of 0 and 1.

Figure 4:
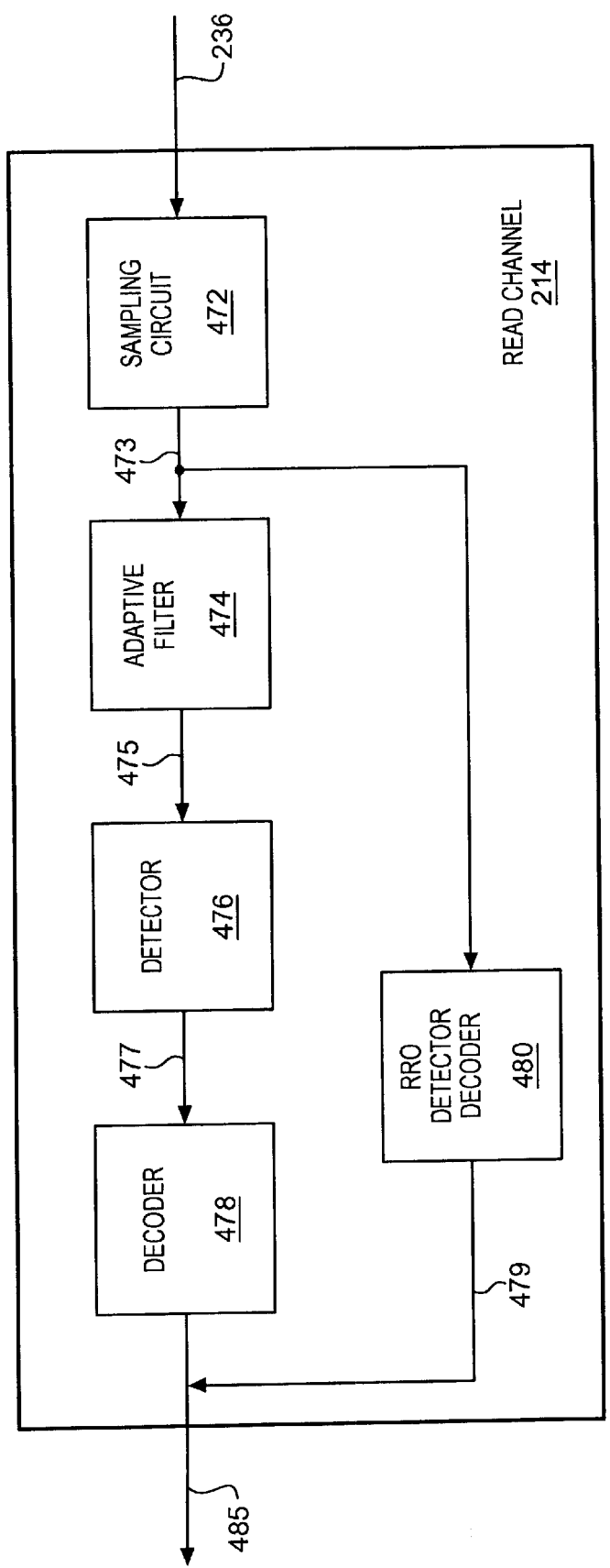
FIG. 4 is a block diagram that depicts a read channel in an example of the invention.
Figure 5:
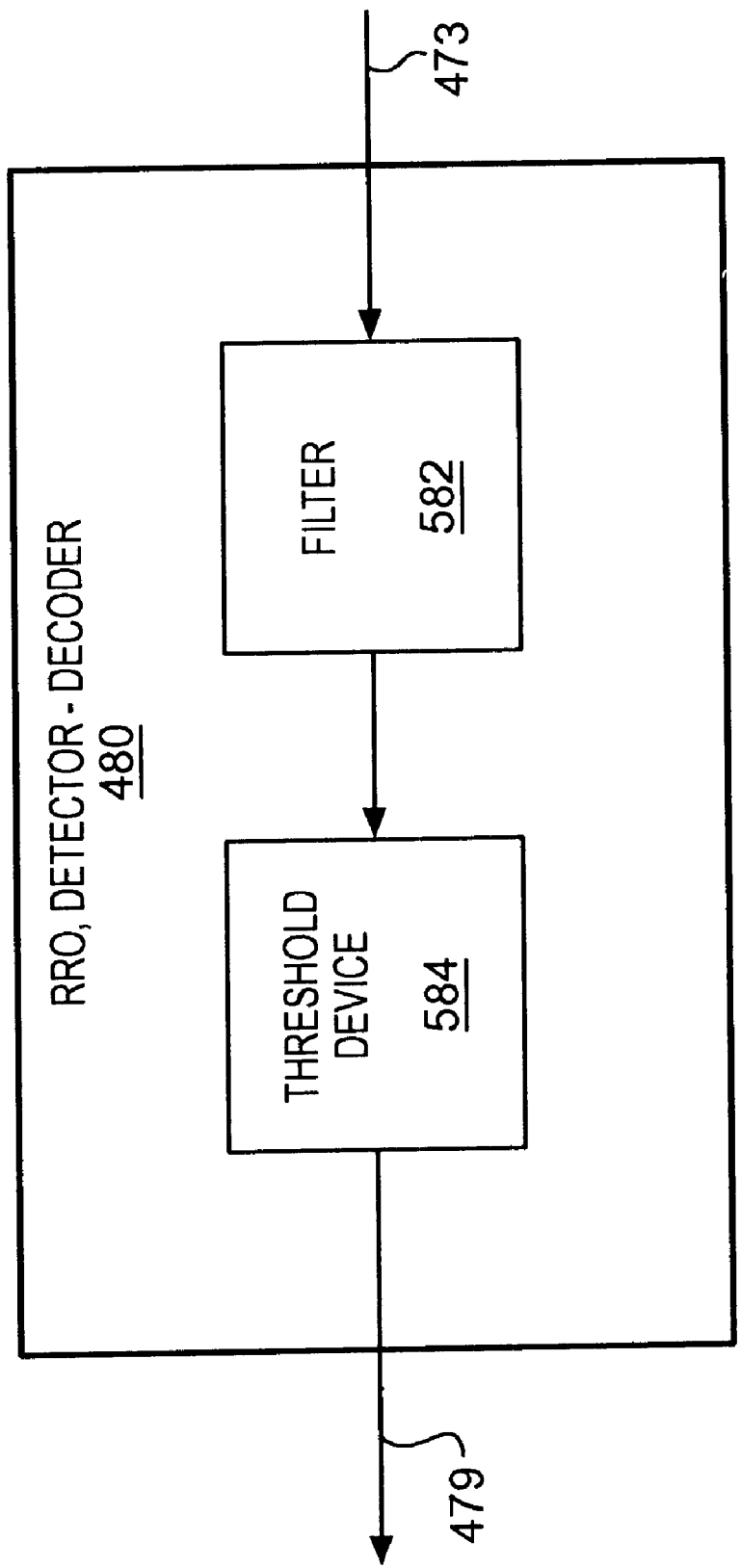
FIG. 5 is a block diagram that depicts an RRO detector decoder in an example of the invention.

Read Channel—FIGS. 4–5

FIG. 4 depicts the read channel 214. The read channel 214 includes a sampling circuit 472, an adaptive filter 474, a detector 476, a decoder 478, and an RRO detector decoder 480. The sampling circuit 472 receives and samples the read signal 236 to generate samples 473 for the adaptive filter 474. The adaptive filter 474 digitally shapes the samples 473 to produce an equalized signal 475 for the detector 476. The detector 446 detects encoded PR4 signals 477 from the equalized signal 475 and transfers the encoded PR4 signals 477 to the decoder 478. The decoder 478 decodes the encoded PR4 signals 477 into user data and servo data. Those skilled in the art will appreciate that the detector 476 and the decoder 478 could be distributed across separate functional blocks for user data and for servo data.

The RRO detector decoder 480 receives the samples 473 from the sampling circuit 472 and may receive a servo synch mark detection signal from the decoder 478. The RRO detector decoder 480 operates as described above for FIG. 3 to detect and decode RRO data 479 from the samples 473. The RRO data 479 is combined with the user data and the servo data from the decoder 478 to form a data signal 485 containing the bit sequence 237.

FIG. 5. depicts the RRO detector and decoder 580 for deriving the RRO data 479 from the samples 473. The RRO detector and decoder 580 includes a filter 582 and a threshold device 584. The filter 582 receives the samples 473. The filter 582 is matched to the di-bits of the encoded RRO signals and has an impulse response of $(-1+D^N)$ where N is the number of samples between the two pulses in the di-bit. The threshold device 584 samples the filter 582 output near its peak for each RRO bit. If the filter 582 output is greater than zero, then "1" is detected, and if not, "0" is detected, resulting in the RRO data 479. This sampling occurs at twice servo bit rate at end of the servo burst. Oversampling allows the elimination of a phase lock loop with some loss. The timing between each RRO bit could be provided by counting a specified number of clocks at the sample rate. The timing of the first bit is determined by finding the maximum amplitude sample in a window of about three samples in which the peak is expected to occur. Alternatively, each bit may be used to update or improve the timing estimate. The servo synch mark or a new synch mark may also be used to set the timing for the first RRO bit.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. Disk drive control circuitry comprising:
    detection circuitry configured to detect encoded signals representing "0" and "1" auxiliary data bits in a read signal from a disk device; and
    decoding circuitry configured to decode the encoded signals into the auxiliary data bits wherein the encoded signals representing the "0" auxiliary data bits have the opposite polarity from the encoded signals representing the "1" auxiliary data bits and wherein polarity reversal pulses are between consecutive ones of the encoded signals with opposite polarities.

2. The disk drive control circuitry of claim 1 wherein the auxiliary data bits are repeatable run-out data.

3. The disk drive control circuitry of claim 2 further comprising servo circuitry configured to process the repeatable run-out data to generate a position signal for the disk device.

4. The disk drive control circuitry of claim 3 wherein the servo circuitry is configured to process servo data to generate the position signal for the disk device.

5. The disk drive control circuitry of claim 1 wherein the encoded signals representing the "0" auxiliary data bits are each "−1 −1 1 1" and the encoded signals representing the "1" auxiliary data bits are each "1 1 −1 −1".

6. The disk drive control circuitry of claim 5 wherein the polarity reversal pulses are "1 1" when the encoded signals "1 1 −1 −1" for the "1" auxiliary data bits are followed by the encoded signals "−1 −1 1 1" for the "0" auxiliary data bits, and wherein the polarity reversal pulses are "−1 −1" when the encoded signals "−1 −1 1 1" for the "0" auxiliary data bits are followed by the encoded signals "1 1 −1 −1" for the "1" auxiliary data bits.

7. The disk drive control circuitry of claim 1 wherein the control circuitry comprises a read channel.

8. A disk drive system comprising;
    a disk device configured to store user data, servo data, and auxiliary data and to transfer a read signal representing the user data, the servo data, and the auxiliary data; and
    control circuitry configured to detect encoded signals representing "0" and "1" auxiliary data bits from the read signal and to decode the encoded signals into the auxiliary data bits, wherein the encoded signals representing the "0" auxiliary data bits have opposite polarity from the encoded signals representing the "1" auxiliary data bits, and wherein polarity reversal pulses are between consecutive ones of the encoded signals with opposite polarities.

9. The disk drive system of claim 8 wherein the auxiliary data bits are repeatable run-out data.

10. The disk drive system of claim 9 further comprising servo circuitry configured to process the repeatable run-out data to generate a position signal.

11. The disk drive system of claim 10 wherein the disk device is configured to position a head to compensate for repeatable run-out error in response to the position signal.

12. The disk drive system of claim 10 wherein the servo circuitry is configured to process the servo data to generate the position signal.

13. The disk drive control circuitry of claim 8 wherein the control circuitry is configured to sample and filter the read signal.

14. The disk drive control circuitry of claim 8 wherein the control circuitry is configured to transfer the user data to a computer system.

15. A method for operating disk drive control circuitry, the method comprising:
    detecting encoded signals representing "0" and "1" auxiliary data bits in a read signal from a disk device; and
    decoding the encoded signals into the auxiliary data bits wherein the encoded signals representing the "0" auxiliary data bits have the opposite polarity from the encoded signals representing the "1" auxiliary data bits and wherein polarity reversal pulses are between consecutive ones of the encoded signals with opposite polarities.

16. The method of claim 15 wherein the auxiliary data bits are repeatable run-out data.

17. The method of claim 16 further comprising processing the repeatable run-out data to generate a position signal for the disk device.

18. The method of claim 17 further comprising processing servo data to generate the position signal for the disk device.

19. The method of claim 15 wherein the encoded signals representing the "0" auxiliary data bits are each "−1 −1 1 1"

and the encoded signals representing the "1" auxiliary data bits are each "1 1 –1 –1".

20. The method of claim 19 wherein the polarity reversal pulses are "1 1" when the encoded signals "1 1 –1 –1" for the "1" auxiliary data bits are followed by the encoded signals "–1 –1 1 1" for the "0" auxiliary data bits.

21. The method of claim 20 wherein the polarity reversal pulses are "–1 –1" when the encoded signals "–1 –1 1 1" for the "0" auxiliary data bits are followed by the encoded signals "1 1 –1 –1" for the "1" auxiliary data bits.

22. A method for operating a disk drive system, the method comprising;
  transferring a read signal representing user data, servo data, and auxiliary data from a disk device to control circuitry;
  in the control circuitry, detecting encoded signals representing "0" and "1" auxiliary data bits from the read signal; and
  in the control circuitry, decoding the encoded signals into the auxiliary data bits, wherein the encoded signals representing the "0" auxiliary data bits have opposite polarity from the encoded signals representing the "1" auxiliary data bits, and wherein polarity reversal pulses are between consecutive ones of the encoded signals with opposite polarities.

23. The method of claim 22 wherein the auxiliary data bits are repeatable run-out data.

24. The method of claim 23 further comprising processing the repeatable run-out data bits to generate a position signal.

25. The method of claim 24 further comprising positioning a head to compensate for repeatable run-out error in response to the position signal.

26. The method of claim 24 further comprising processing the servo data to generate the position signal.

27. The method of claim 22 further comprising sampling and filtering the read signal.

28. The method of claim 22 further comprising transferring the user data to a computer system.

29. A read channel comprising:
  a sampling circuit configured to receive and sample a read signal from a disk device to generate samples;
  an adaptive filter configured to shape the samples to produce an equalized signal;
  a detector configured to detect encoded signals in the equalized signal; and
  a decoder configured to decode the encoded signals into user data, servo data, and auxiliary data wherein the encoded signals representing "0" auxiliary data bits have the opposite polarity from the encoded signals representing "1" auxiliary data bits and wherein polarity reversal pulses are between consecutive ones of the encoded signals with opposite polarities.

30. The read channel of claim 29 wherein the auxiliary data bits are repeatable run-out data.

31. The read channel of claim 29 wherein the encoded signals representing the "0" auxiliary data bits are each "–1 –1 1 1" and the encoded signals representing the "1" auxiliary data bits are each "1 1 –1 –1".

32. The read channel of claim 30 wherein the polarity reversal pulses are "1 1" when the encoded signals "1 1 –1 –1" for the "1" auxiliary data bits are followed by the encoded signals "–1 –1 1 1" for the "0" auxiliary data bits, and wherein the polarity reversal pulses are "–1 –1" when the encoded signals "–1 –1 1 1" for the "0" auxiliary data bits are followed by the encoded signals "1 –1 –1" for the "1" auxiliary data bits.

* * * * *